United States Patent [19]

Keifert

[11] 4,117,201
[45] Sep. 26, 1978

[54] CORROSION AND EROSION RESISTANT LINED EQUIPMENT

[75] Inventor: Hibbard G. Keifert, Torrance, Calif.

[73] Assignee: Fansteel Inc., N. Chicago, Ill.

[21] Appl. No.: 708,059

[22] Filed: Jul. 23, 1976

[51] Int. Cl.² .............................................. B21D 7/18
[52] U.S. Cl. .................................... 428/591; 422/241;
138/148; 138/155; 138/173; 138/177;
138/DIG. 6; 138/DIG. 8; 428/594; 228/183;
228/184
[58] Field of Search ............... 138/140, 141, 142, 143,
138/144, 145, 146, 147, 148, 155, DIG. 6, DIG.
8, DIG. 10, 173, 177; 228/183, 184; 428/591,
593, 594, 604; 23/252 R

[56] References Cited

U.S. PATENT DOCUMENTS

| 1,153,724 | 9/1915 | Stocker | 138/140 |
|---|---|---|---|
| 1,964,123 | 6/1934 | Kaiser | 138/148 |
| 2,172,819 | 9/1939 | Howard et al. | 228/184 |
| 2,991,806 | 7/1961 | Rocheville et al. | 138/148 |
| 3,148,953 | 9/1964 | Goto | 228/184 |
| 3,235,947 | 2/1966 | Söhlemann | 228/183 |
| 3,394,446 | 7/1968 | Valyi | 428/594 |
| 3,848,314 | 11/1974 | Stohr | 428/614 |
| 3,956,543 | 5/1976 | Stangeland | 428/604 |

Primary Examiner—L. Dewayne Rutledge
Assistant Examiner—Michael L. Lewis
Attorney, Agent, or Firm—Barnes, Kisselle, Raisch & Choate

[57] ABSTRACT

An improved composite construction and method for fabrication of equipment having a corrosion resistant liner and an additional erosion resistant liner, in critical areas, on a base metal backing.

12 Claims, 5 Drawing Figures

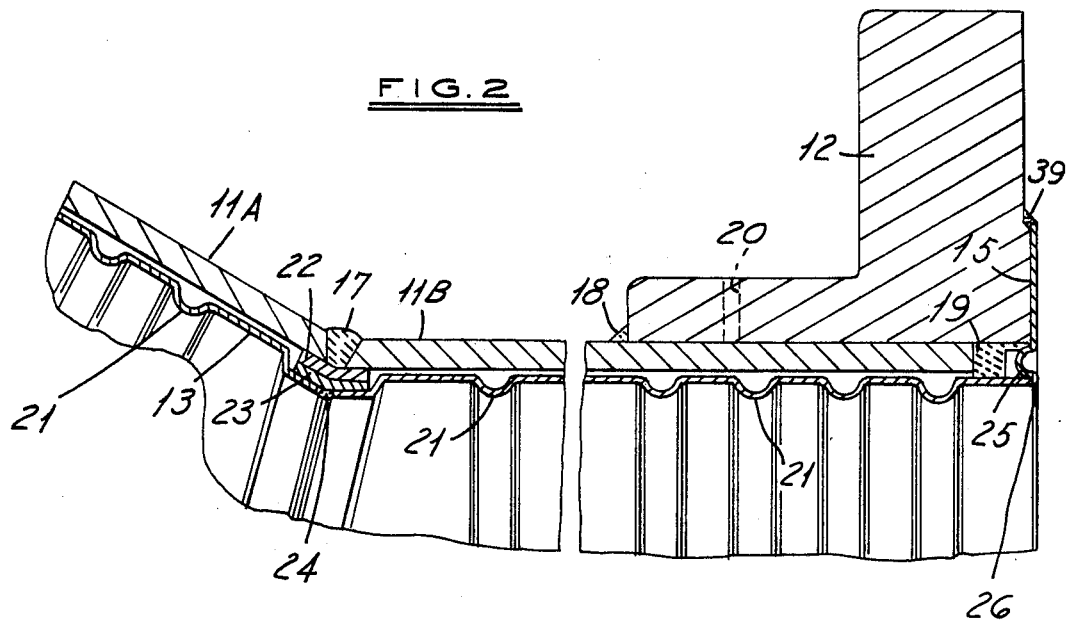
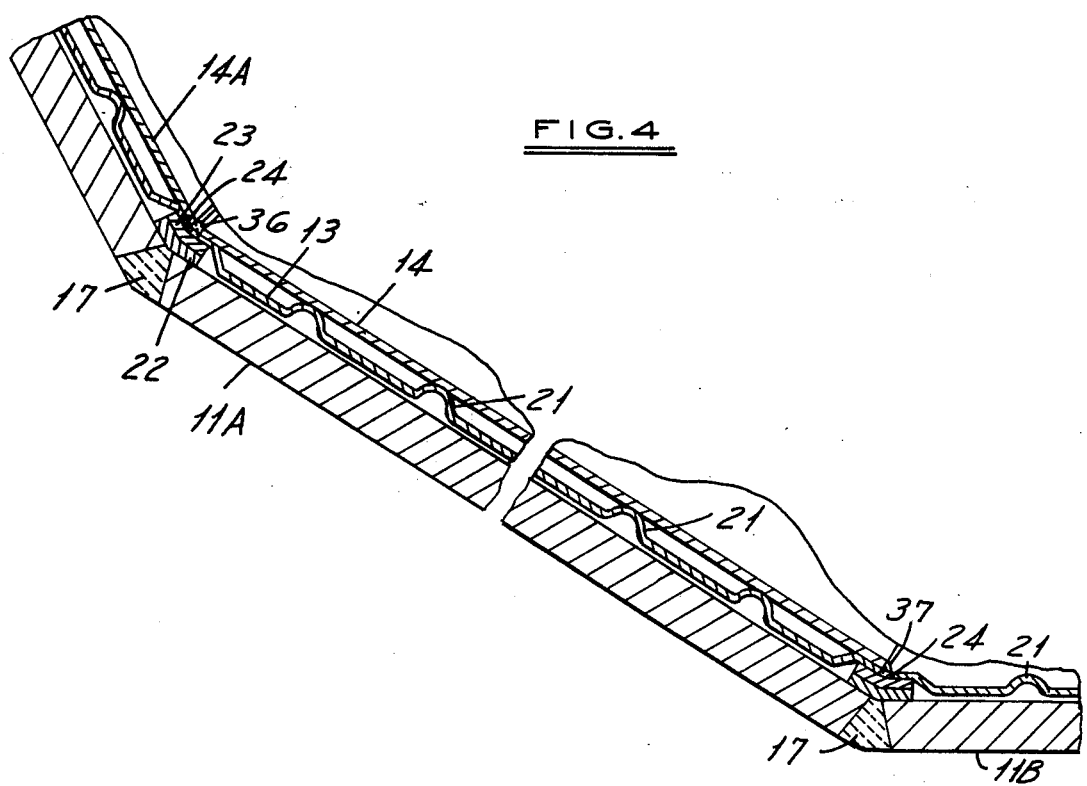

CORROSION AND EROSION RESISTANT LINED EQUIPMENT

This invention covers an improved equipment construction assembly and method of construction for use in the fabrication of chemical process equipment that has walls comprised of two or more layers of materials, especially for chemical process applications in which both resistance to corrosion and resistance to erosion are required. The method of construction relates to improvements in the welded joints in such equipment in which a surface layer of a special purpose metal or alloy, such as a metal having high corrosion resistance, is used in conjunction with a backing of a more common base metal. The invention especially relates to an improved wall construction with a surface lining or facing of a dissimilar material to that of the backing material, and particularly to cases where the facing material is not generally metallurgically compatible with the backing material. It also relates to improved wall construction in which an additional lining or facing of a erosion and corrosion resistant material, metallurgically compatible with the corrosion resistant lining, is superimposed in critical areas subject to erosion as well as corrosion during service. It further relates to an improved wall construction for bonding the facing material to the backing material with a corrosion resistant brazing material, such as on the facing sheet of flanges.

The improved construction and method of fabrication of this invention can be applied to a wide variety of industrial equipment, especially chemical process equipment, and can be used with a large number of dissimilar metal combinations. These combinations include ductile, fabricable, and weldable refractory and reactive metals, or their alloys, as linings or facings on backing materials such as mild steels, stainless steels, copper-base alloys, nickel-base alloys, and cobalt-base alloys. The improved method is generally applied to wall assemblies where the special purpose metal is not metallurgically bonded to the backing over the major portion of the equipment, but it can be applied with some modifications to wall assemblies where the special purpose metal is metallurgically bonded to the backing.

Special purpose metal or alloy layers on a more common base metal substrate are well known in the art and have been used for many years. One general area where such dissimilar metal combinations have been employed is in chemical process equipment. Here it is typical practice to use a relatively thin layer of the special purpose metal or alloy to provide resistance to chemical attack, and use a lower cost, more common base metal as the structurally supporting backing. The fabrication of such equipment can present severe problems, especially when the lining material is metallurgically dissimilar to the backing material. For instance, consider a tantalum layer on a mild steel backing. Tantalum has a melting point about 3000° C (5,430°F), while mild steel melts at about 1,530° C (2,790° F); mild steel has a coefficient of thermal expansion about twice that of tantalum; and iron and tantalum react at a sufficiently high temperature to produce the brittle intermetallic compound TaFe$_2$ and eutectics of this compound and the terminal iron-rich and tantalum-rich solid solutions (see "Columbium and Tantalum," by F. T. Sisco and E. Epremian, published by John Wiley and Sons, Inc., 1963).

One principal object of this invention is to provide an improved composite wall construction and method of fabrication of a composite assembly comprised of a fusion welded thin layer of a special purpose metal or alloy such as a refractory metal or reactive metal, or their alloys, and a fusion welded iron-base or non-ferrous base metal on which the facing material generally is not metallurgically bonded to the base metal.

Another principal object is to provide a composite construction and method for fabrication comprised of a fusion welded thin layer of a special purpose metal or alloy such as refractory or reactive metal or their alloys and a fusion welded iron-base or non-ferrous base metal on which the facing may either be metallurgically bonded or unbonded, and which has an additional layer of a special purpose, corrosion and erosion resistant metal or alloy such as a refractory metal, or reactive metal, or their alloys superimposed in selective locations over the corrosion resistant facing.

An additional object is to provide an improved construction and method of fabrication to produce sound, high quality, contamination free welds having a smooth, relatively distortion-free surface in all layers.

A further object is to provide an improved construction and method of fabrication for equipment comprised of a combination of a corrosion resistant and erosion resistant layer on a base metal to achieve a final welded composite construction assembly that will resist the differential thermal expansion between the base metal and the lining material during service and thus provide a long service life.

These and other objectives provided by this improved construction and method of fabrication will be apparent to those skilled in the art by the following description of drawings and the preferred embodiment of the invention.

Preliminary Discussion of the Drawings

FIG. 2 shows a longitudinal section at the lower right end of the elbow shown in FIG. 1 adjacent to the flange.

FIG. 4 shows a longitudinal section of a wall construction at about the 7 to 8 o'clock position of FIG. 1, and illustrates the erosion resistant liner superimposed over the corrosion resistant lining in the portion of the part most subject to erosion during service.

GENERAL DESCRIPTION OF THE INVENTION

Figure 1:
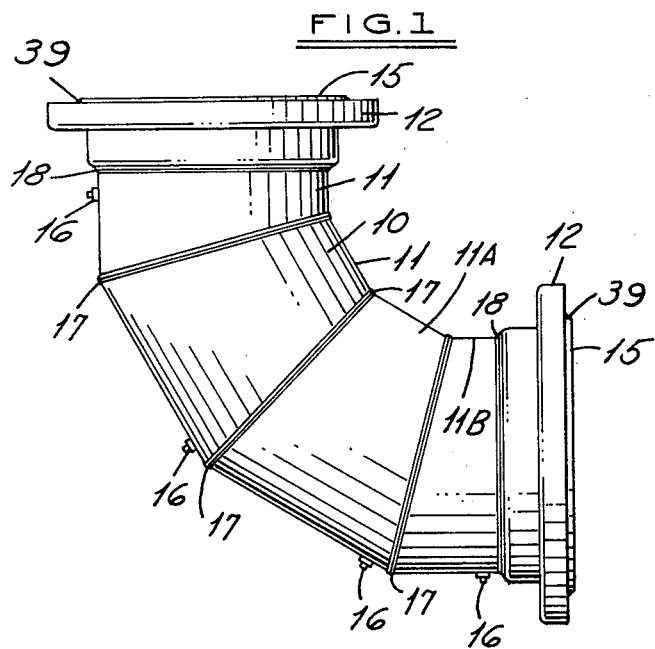
FIG. 1 shows a side view, partially in section, of a 90° elbow for a 30 inches diameter line employing the improved construction and method of fabrication.

An example of the improved construction and method of fabrication of this invention is given as a specific embodiment in which the same tantalum material is employed both as a corrosion resistant facing material on a mild steel backing material, and as a corrosion plus erosion resistant material superimposed as an additional layer in portions of the assembly subject to severe erosion as well as corrosion during service. Tantalum-lined or clad materials have been used in a wide variety of chemical process applications where tantalum provides corrosion resistance to the severe corrosive conditions. Because of the high cost of tantalum, such composite wall constructions as used in chemical process equipment typically utilize a thin tantalum lining to resist the corrosion conditions, and a lower cost base metal, commonly mild or plain carbon steel, as the structural member or backing material in the wall. Some examples of such tantalum lined chemical process eqipment include thermowells, bayonet heaters, various condensers and heat exchangers, vessels, piping, valves and fittings.

In the specific embodiment described in the example, the lining is usually either commercially pure, unalloyed tantalum, or it may be a tantalum alloy such as Fansteel "63" Metal manufactured by Fansteel Inc. The Fansteel "63" Metal contains 2.5 weight percent tungsten, 0.15 weight percent columbium, balance essentially tantalum as discussed in commonly assigned U.S. Pat. 3,592,639.

This tantalum alloy material has an ultimate tensile strength about 50 percent higher and yield strength about twice that of unalloyed tantalum at a temperature about 200° C (390° F), which temperature is experienced in a growing number of chemical process applications. The corrosion resistance of this alloy has been shown to be at least equal to pure tantalum in many environments.

Although the lining material is described as unalloyed tantalum or Fansteel "63" Metal in the preferred embodiment, it should be readily apparent that the wall construction and method of fabricating it, as described in this invention, can be equally well applied when the facing material is essentially any ductile, fabricable and weldable refractory metal or alloy of metals from Group VA of the Periodic Table of Elements including other tantalum-base alloys, columbium and columbium-base alloys, and vanadium and vanadium-base alloys, or the Group IVA reactive metals titanium, zirconium, and hafnium, and their alloys.

The specific embodiment of the wall construction that is described employs mild steel as the backing material. Again, backing materials that can be utilized in wall constructions of this invention can be one or more layers of a number of common base metals, such as other fabricable and weldable steels, including stainless steels, copper-base, nickel-base, and cobalt-base materials; or the backing material can be a refractory metal or reactive metal, or their alloys, having a composition different from that of the facing material.

In some chemical process applications, the equipment must also resist erosion by solid particles as well as have adequate resistance to the chemical environment.

The above-described Fansteel "63" Metal has a higher hardness and hence improved resistance to erosion or abrasion as compared to unalloyed tantalum, as well as having good fabricability, weldability and corrosion resistance. Thus, this material is utilized in the specific embodiment of the wall construction described where it is employed as an additional layer superimposed over the Fansteel "63" Metal linear to provide additional resistance to erosion in critical areas of the equipment during service. In this case, the bottom regions of the elbow at about the 7 to 8 o'clock positions as illustrated in FIG. 1 are the regions subject to the most severe erosion and abrasion by inertial contact of the solid particles during service, and so the erosion resistant overlay is utilized in these specific areas.

DETAILED DESCRIPTION OF PREFERRED EMBODIMENT

FIG. 1 shows a 90° elbow for a 30 inches diameter line which employs the improved construction and method of fabrication. The outer jacket 10 of the elbow is fabricated by cutting a layout of trapezoidal shape segments 11 of mild steel, which are formed and welded at the respective joints shown in the drawing to produce the outer steel backing.

The flanges 12 are fusion welded to the last formed segments of the outer jacket.

The thermal expansion compensated, convoluted facing 13 of Fansteel "63" Metal is progressively installed in place and fusion welded to tabs or backing strips 22 and 23, shown in greater detail in FIG. 2, as the elbow is progressively constructed, working from the center of the elbow outward to the flanges at the ends. The double backing strips will be described later in the specification. The work "convolution" is used to describe the annular ribs 21 that are formed on the facing material 13 to be convex to the inside of the assembly.

Figure 3:
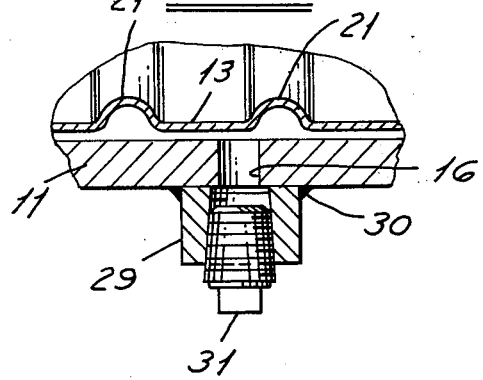
FIG. 3 shows the method for purging the root side of the weld in the corrosion resistant lining.

An erosion resistant Fansteel "63" Metal liner is superimposed over a portion 14 of the thermal expansion compensated liner 13. A portion 15 of the thermal expansion compensated liner also extends over a portion of the face of flange 12 as shown best in FIG. 2. Holes 16, shown in FIG. 1 and detailed in FIG. 3, are provided through the steel backing to provide purging of the underside or root side of the welds in the tantalum material. These purging holes 16 normally are left open even after completing the entire welded assembly since these holes then serve a second purpose of being used for leak detection during service.

FIG. 2 shows an enlarged longitudinal section view to further illustrate the construction. The outer steel shell or base metal backing 11 is bonded to another segment of the base metal backing by a fusion butt weld 17, shown enlarged in FIGS. 2 and 4. To make these fusion welds, the steel substrate in members 11A and 11B, FIG. 2, of base metal backing 11 is machined to provide appropriate groove faces and root faces in preparation for fusion welding. The specific joint geometry used in making the fusion welds in the steel backing is in accordance with "Recommended Proportions for Grooves for Arc Welding," Welding Handbook, Sixth Edition, Section One, American Welding Society.

The welding procedure used for the steel backing is in accordance with the recommended practice given in the same reference in order to produce code quality welds. Other equivalent specifications may be used as alternates. Before welding, all contaminants such as steel chips, oil and grease, or other soils must be thoroughly removed by such techniques as solvent degreasing.

The flanges 12 are welded to the steel shell by outer fillet weld 18 and inner fillet weld 19. A portion of the inner fillet weld 19, FIG. 2, is machined to provide for later placement of the tantalum alloy flange 15 facing. Bleed holes 20 are provided in the flange for venting entrapped air between the steel shell and flange. These vent holes are normally left open to provide venting during service when the equipment is heated to the service temperature. The tantalum alloy lining 13 has a series of rounded groove convolutions 21 that act as flexing bellows to compensate for the difference in coefficient of thermal expansion between the steel and the tantalum lining when the elbow is heated to the process temperature.

An improvement of this invention lies in the use of two layers of tantalum backing material strips 22 and 23 of Fansteel "63" Metal. In the two layers for such backing strips, such as 0.060 inches and 0.030 inches thick strips, respectively, used as strips 22 and 23 in combination rather than one strip of 0.090 inches thickness, the heavier strip is placed next to the steel backing 11. These double strips are much easier to form into the bent cross-section, can be more readily joggled at the end of the liner to secure the liner in place, serve better as a sacrificial backing, aid in keeping the welding joint in alignment, and additionally have been found to be much less likely to be completely penetrated by the tantalum weldment into the steel backing. It is preferable that the strips be of different thicknesses as indicated but this need not be necessarily so. The geometry of the parts will retain them in position but the strips may be tack welded or dimpled to insure registry. The weld 24 will stabilize the strip 23 which will in turn stabilize the under strip 22. The weld 24 preferably goes into but does not go through the thinner member 23 so that it does not go into strip 22.

Adjacent sections of lining 13 are joined to each other and to the backing strip 23 by the fusion butt weld 24 referred to, FIG. 2. A preferred welding practice is to turn up the lips of lining 13 in the area to be welded to a height of 1½ times the thickness of the liner. Then, the lips are clamped with clips until the joint is tack welded. The weld 24 is then completed.

The lining or facing material must be chemically cleaned before welding. In the case where the lining or facing material has been bonded to the steel shell, it is necessary to remove any iron that has been embedded or encapsulated along the surface of the lining material formerly bonded to the steel. The backing strips also must be similarly chemically cleaned before welding.

In welding tantalum materials adequate cleaning of the materials and shielding of the weld area with inert gas are mandatory. Such refractory metal materials can be successfully fusion welded using techniques such as inert gas shielded tungsten arc welding, or electron beam welding. The inert gas shielded tungsten arc welding (often called TIG welding) is the most commonly used procedure, and was used in fabricating the lined elbow described. The region of the tantalum alloy material to be welded is generally evacuated and purged with an inert gas, usually argon, but the inert gas can be any one or a mixture of inert monatomic gases, such as argon, helium, neon, krypton and xenon.

The inert gas must be high purity, and in the case of argon, it must have an oxygen content not exceeding 5 ppm and preferably 1.5 ppm or less. If feasible, the entire assembly to be welded can be placed in a chamber which is evacuated and back filled with the inert gas. In the case of large parts, such as the lined elbow described, a plastic bag or sheet is taped onto the lining or facing, or the entire member may be placed in a plastic bag. A hose is fitted into the bag to inflate and purge the bag and the areas to be welded. An additional hole in the bag permits any residual air to exit, and the flow of gas is continuous so as to purge out any residual contaminants. In addition, argon gas is put through purge holes 16, indicated in FIG. 1, to provide protection at the root side of the welds in the tantalum layers. To further provide an essentially contamination-free welding environment, TIG welds are first made on tabs of titanium until bright welds are obtained before any welding is done on the tantalum material.

FIG. 3 shows the details of purge holes 16 through the steel shell 11 used to provide protection at the root side of the welds in the tantalum alloy liner 13, which contains circumferential convolutions 21 to compensate for thermal expansion differences between the tantalum material and the steel backing. The argon is introduced through a pipe plug 31 secured to the steel shell with a coupling 29, which is tack welded at 30 to steel shell 11.

The welding torch is inserted into an additional hole in the bag to make the weld in the tantalum alloy material. This procedure was used to generate a good quality tantalum weld 24 joining the lining sections to each other and to strip 23 of the two layers of tantalum material backing strips 22 and 23.

The same procedure is also used in joining tantalum alloy face sheet 15 on the face end of steel flange 12 to tantalum alloy liner 13. The tantalum alloy face sheet 15 is formed as shown at 25 in FIG. 2 so that a lip weld 26 can be effected between the tantalum face sheet 15 and liner 13.

FIG. 4 shows a partial longitudinal section illustrating the attachment of an additional tantalum alloy layer to provide erosion or abrasion resistance in critical areas of the elbow. This drawing shows an enlarged weld assembly of the steel shell sections 11 by fusion butt welds 17. As described in FIG. 2, the tantalum alloy liner 13, which contains circumferential convolutions 21 to provide compensation for the thermal expansion difference between the tantalum liner and the steel shell, is inserted over the entire inner surface of the elbow and over the two layers of backing strips such as 22 and 23. Fusion butt welds 24 are used to join sections of liner 13 to each other and to strip 22 of the backing strips 22 and 23. Then, half circular sheets 14 and 14A of Fansteel "63" Metal are superimposed over tantalum alloy liner 13 into juxtaposition with the convex convolutions 21, and are joined by TIG welds 36 and 37 to liner 13 at positions directly over tantalum backing strips 22 and 23.

If desired, the erosion and abrasion resistance of the layers 14 and 14A can be further improved by surface hardening before they are installed in the elbow. Such surface hardening can be done by various techniques such as by oxidizing in air or oxygen, or by nitriding treatments. Such hardening is produced by interstitial diffusion of elements such as oxygen and nitrogen into the tantalum material as is well known in the art. For example, a treatment of Fansteel "63" Metal at a temperature of 550° C for one hour or more, or at higher temperatures, will produce an extremely hard skin layer on this tantalum material. Such hardening treatments have been used to provide abrasion resistance to tantalum materials in some applications where a single layer of solid cross section of tantalum has been used, such as in valve plugs and seats.

Figure 5:
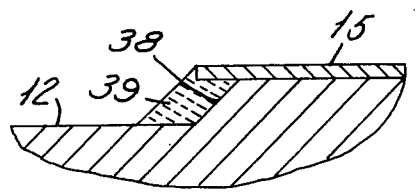
FIG. 5 shows the joint construction of an improved braze with pure silver to provide a corrosion resistant sealing of the lining against the base metal on the flange faces.

To complete the construction of the lined elbow, it is preferable, for purposes of providing adequate corrosion resistance in the application, to use commercially pure silver rather than a conventional silver brazing alloy, such as silver-copper, silver-copper-zinc, or silver-copper-zinc-cadmium types of brazing alloys to seal face sheet 15, FIG. 1, flush to steel flange face 12 as illustrated in enlarged detail in FIG. 5. Due to the poor fluidity of pure silver compared to that of the silver brazing alloys, the steel flange face 12 is machined to provide a 45° undercut 38 below the outer edge of tantalum alloy flange facing 15. After cleaning, this complete circumferential groove is filled with pure silver 39 to provide the sealing configuration shown in FIG. 5.

It will be seen that the composite structure is such that in use even though the expansion of the steel has a coefficient of thermal expansion twice that of the tantalum liner, for example, the differential expansion can take place without strain on the welded joints. The liner is not welded to the outer shell 11 at any point between the ends. The formed backing strips 22, 23 are geometrically confined but some movement is possible. The convolutions 21 allow longitudinal stretching of the inner layer 13 so that the welded joints 24 will not be under strain.

In the drawings, the liner 13 is shown spaced slightly from the steel backing 11. This is to signify that in assembly the parts are not in skin tight relation. The backing strips 22 and 23, concave in cross-section, will be geometrically trapped by the relationship, and the relatively loose fit of parts 13 relative to parts 11 enables assembly without too much hammering and forcing. In addition, the loose fit makes it possible to purge air from between the parts through holes 16 prior to the welding operation. Once the parts are assembled and welded and subject to pressurization in use, the protective sheet 13 will lie in contact with the inner walls of the steel structural envelope. Also, the geometrical confinement of the batten strips 22 and 23 still allows movement of the parts to compensate for differences in expansion and contraction and avoid undue strain on the welded joints.

Fabrication of a liner 90° elbow for a 30 inches diameter line has been illustrated as an example of the assembly and method of fabricating it. However, the improvements incorporated in the assembly and the method of assembly are not limiting since the assembly and the method of construction described can be applied to a broad range of lined equipment as covered by the claims.

I claim:

1. In a wall assembly of industrial equipment to resist corrosion of the type having a first structural layer of metal to provide mechanical strength and a second corrosion resistant protective layer of metal lying generally in face-to-face relation with said first layer, said frst structural layer of metal consisting essentially of iron, copper, nickel, cobalt, and fabricatable and weldable alloys thereof, said second layer of metal consisting essentially of titanium, zirconium, hafnium, tantalum, columbium, vanadium, and fabricatable and weldable alloys thereof, said second layer having at least two sections joined together, that improvement in joints uniting adjacent portions of said sections of said second layer which comprises:
   a. means comprising at least two lapped backing strips of metal interposed between said first and second layers and underlying said adjacent portions of said sections of said second layer prior to fusion welding together said adjacent portions of said sections, said backing strips of metal each consisting essentially of titanium, zirconium, hafnium, tantalum, columbium, vanadium, and fabricatable and weldable alloys thereof, and
   b. a continuous fusion weld uniting together said adjacent portions of said sections of said second layer without uniting any of said backing strips to said first layer.

2. A wall assembly as defined in claim 1 in which said means comprising backing strips is formed of a plurality of overlying strips, one to lie in contact with said first layer and one to lie in contact with said second layer, and each to lie in contact with each other on the sides not in contact with a first or second layer.

3. A wall assembly as defined in claim 2 in which said first layer has a joint adjacent said joint between said adjacent portions of said sections of said second layer, said joint in said first layer having adjacent portions inclined with respect to each other, said adjacent portions of said second layer also being inclined with respect to each other and generally complimentary with the inclination of said adjacent portions of said first layer, and said backing strips having in cross-section inclined portions generally conforming with the inclination of said adjacent portions of said joints such that said backing strips interfit with and are confined by said joints.

4. A wall assembly as defined in claim 1 in which said fusion weld also joins to said second layer at least the one of said backing strips immediately adjacent said second layer.

5. A wall assembly as defined in claim 2 in which said fusion weld also joins to said second layer at least the one of said said backing strips immediately adjacent said second layer.

6. A wall assembly as defined in claim 3 in which said fusion weld joining said adjacent portions of said sections of said second layer also joins together the one of said backing strips immediately adjacent said second layer and underlying said fusion weld of said adjacent portions of said sections, and said backing strip immediately adjacent said first layer being unwelded to any of said other backing strips.

7. A wall assembly as defined in claim 1 in which a third layer of an erosion resistant metal is superimposed over said second layer to provide erosion and corrosion resistance in high wear areas of the equipment, said third layer being attached by fusion welds superimposed over the fusion welds of said joints of said adjacent portions of said sections of said second layer.

8. A wall assembly as defined in claim 1 in which said assembly includes an attaching flange having a face surface and a groove formed in said surface, said second layer having a portion overlying said face surface with an edge overlying a portion of said groove, and a braze in said groove joining said edge and said flange.

9. A wall assembly as defined in claim 1 in which said first layer consists essentially of an iron-base metal and alloys thereof and said second layer consists essentially of tantalum and alloys thereof.

10. A wall assembly as defined in claim 7 in which said third layer is of the same metal as said second layer.

11. A wall assembly as defined in claim 7 in which said third layer of metal consists essentially of titanium, zirconium, hafnium, tantalum, columbium, vanadium, and fabricatable and weldable alloys thereof.

12. A wall assembly as defined in claim 8 wherein the brazing material of said braze consists essentially of silver of at least commercial purity.

* * * * *